United States Patent
Brüske

(10) Patent No.: US 12,028,008 B2
(45) Date of Patent: Jul. 2, 2024

(54) CONTROL UNIT, CONTROL CIRCUIT AND MOTOR VEHICLE

(71) Applicant: AUDI AG, Ingolstadt (DE)

(72) Inventor: Stephan Brüske, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/222,470

(22) Filed: Apr. 5, 2021

(65) Prior Publication Data

US 2021/0313920 A1   Oct. 7, 2021

(30) Foreign Application Priority Data

Apr. 6, 2020 (DE) .......................... 102020109481.7

(51) Int. Cl.
  *H02P 29/028* (2016.01)
  *B60L 15/20* (2006.01)
(52) U.S. Cl.
  CPC ............ *H02P 29/028* (2013.01); *B60L 15/20* (2013.01)
(58) Field of Classification Search
  CPC ...... H02P 29/028; H02P 25/022; H02P 25/02; H02P 25/16; H02P 27/06; B60L 15/20; Y02T 10/72; H02K 17/34
  See application file for complete search history.

(56) References Cited

U.S. PATENT DOCUMENTS

| 11,095,211 | B2 | 8/2021 | Herrmann et al. | |
| 2006/0061336 | A1* | 3/2006 | Anghel ................... | H02P 9/30 |
| | | | | 322/59 |
| 2008/0001570 | A1 | 1/2008 | Gaetani et al. | |
| 2013/0043816 | A1* | 2/2013 | Welchko ................. | H02M 1/32 |
| | | | | 318/400.21 |
| 2013/0207589 | A1 | 8/2013 | Margner et al. | |
| 2015/0185095 | A1* | 7/2015 | Wu ......................... | H02P 21/20 |
| | | | | 73/862.08 |
| 2017/0033725 | A1* | 2/2017 | Koseki ................... | B62D 5/0484 |
| 2018/0142662 | A1* | 5/2018 | Dal ......................... | F02C 7/268 |

FOREIGN PATENT DOCUMENTS

| CN | 102079250 A | 6/2011 |
| CN | 109845085 A | 6/2019 |
| DE | 10 2009 014 703 A1 | 10/2010 |
| DE | 10 2011 078 155 A1 | 1/2013 |
| DE | 10 2017 101 069 A1 | 7/2017 |
| DE | 102016206765 A1 | 10/2017 |
| DE | 10 2016 216 238 A1 | 3/2018 |

(Continued)

OTHER PUBLICATIONS

Roads Vehicles—Functional Safety Part 1 Vocabulary, ISO/FDIS, 26262-1:2018(E), 40 pages.

(Continued)

*Primary Examiner* — Bickey Dhakal
(74) *Attorney, Agent, or Firm* — Seed IP Law Group LLP

(57) ABSTRACT

A system comprises a control unit for operating an electrical circuit arrangement connected to an electrical machine, wherein the electrical circuit arrangement is designed to energize a stator of the electrical machine, the control unit being connectable to at least one further circuit arrangement which is designed to energize a rotor of the electrical machine, the control unit being set up to operate the further circuit arrangement.

16 Claims, 1 Drawing Sheet

(56) References Cited

FOREIGN PATENT DOCUMENTS

| | | |
|---|---|---|
| DE | 10 2016 223 624 A1 | 5/2018 |
| DE | 10 2018 214 864 A1 | 3/2020 |
| WO | WO-2016133502 A1 * | 8/2016 ............. B60L 15/02 |
| WO | 2016/162624 A1 | 10/2016 |

OTHER PUBLICATIONS

Office Action, dated Jun. 21, 2023, for Chinese Patent Application No. Chinese Patent Application for Invention No. 202110346816.X. (6 pages).

\* cited by examiner

CONTROL UNIT, CONTROL CIRCUIT AND MOTOR VEHICLE

BACKGROUND

Technical Field

Embodiments of the invention relate to a control unit for operating an electrical circuit arrangement connected to an electrical machine, wherein the circuit arrangement is designed to energize a stator of the electrical machine. Furthermore, embodiments of the invention relate to a control unit and a motor vehicle.

Description of the Related Art

In motor vehicles with electric drive motors, power electronic circuits are generally used to operate the electric motor. For example, traction inverters are used to operate a three-phase electric motor. Such an electric motor can, for example, be a permanently excited synchronous motor, the exciter field of which is generated by permanent magnets. In the case of electric motors in which the rotors do not have permanent excitation of the rotor, additional power electronic circuits are used to also energize the rotor winding of such an externally excited electric machine.

DE 10 2009 014 703 A1 describes a method for operating an externally excited synchronous machine in which the field coils that are arranged on the rotor of the synchronous machine are operated by means of an exciter current controller. If the field coils are not energized and/or if the exciter field fails, the externally excited synchronous machine continues to operate as a reluctance machine or as an asynchronous machine.

A circuit for controlling an excitation current for an excitation winding of an electrical machine is known from DE 10 2016 216 238 A1. The circuit comprises two switching contacts for contacting two different ends of the excitation winding. Furthermore, the circuit comprises a measuring unit for measuring an excitation current as well as a control unit which generates an excitation current based on the measured excitation current signal.

DE 10 2011 078 155 A1 relates to a method for determining an excitation current output for an excitation current through an excitation winding and for determining phase current outputs for the phase currents through phase strands of an electrical machine. In so doing, a measuring current is measured via a current measuring device in a supply line for the phase strands and for the excitation winding, which corresponds to the sum of one or more of the phase currents and/or the excitation current. The state of energization on which the current measurement is based is specified by a switching pattern of a rectifier and an excitation circuit.

Such operating methods or alternatively the associated electrical circuits are in each case assigned to a specific type of electrical machine and are not designed for operating electrical machines of a different type.

BRIEF SUMMARY

Embodiments of the invention are therefore based on the task of specifying a control unit for operating an electrical circuit arrangement connected to an electrical machine, which can be used flexibly for different types of machines.

To solve this task, in the case of a control unit of the initially mentioned type, it is provided that the control unit can be connected to at least one further circuit arrangement which is designed to energize a rotor of the electrical machine, wherein the control unit is configured to operate the further circuit arrangement.

The control unit has the advantage that it can be used to operate various types of electrical machines. For example, by operating the circuit arrangement connected to an electrical machine, the control unit can be used to energize a stator in permanently excited electrical machines. In particular, the electrical circuit arrangement may be configured to energize a stator of the electrical machine with an alternating current. In permanently excited electrical machines, no excitation current is required to generate an excitation field in a rotor of the electrical machine, so that a further circuit arrangement for energizing the rotor is not required. However, in order to also be able to use the control unit with electrical machines which are externally excited, i.e., in which an excitation current must be generated in the rotor by a further circuit arrangement, the control unit is designed to be connected to at least one further circuit arrangement for energizing the rotor of the electrical machine.

Furthermore, the control unit is also configured to operate the further circuit arrangement. This enables the control unit, or alternatively a control circuit that comprises the control unit and the electrical circuit arrangement for energizing a rotor of the electrical machine, to be used for different types of electrical machines, such as permanently excited synchronous machines, externally excited synchronous machines and asynchronous machines.

A further circuit arrangement for energizing a rotor of the electric machine, which may be used, can be advantageously provided with a reduced scope or with reduced expense, since the operation of the further circuit arrangement can also be performed by the control unit connected to the further circuit arrangement. Advantageously, functions implemented in the control unit can also be designed for the operation of the further circuit arrangement and, in the case that a further circuit arrangement is connected to the control unit, can also be used for its operation.

The control unit is, in particular, designed for controlling and/or regulating the electrical circuit arrangement and the further electrical circuit arrangement. By also using the control unit for operating a further circuit arrangement, if this is required for the type of electrical machine used, the further circuit arrangement is enabled to make use of functions already implemented in the control unit, so that these functions do not have to be provided once again for the further circuit arrangement. This reduces the circuitry expenditure required for the further circuit arrangement and thereby also makes it possible to use a further circuit arrangement that is more cost-effective.

In some embodiments, it can be provided that the circuit arrangement and/or the further circuit arrangement each comprise a driver circuit and a power electronic circuit comprising at least one switching element, wherein the control unit is designed to drive the driver circuit of the circuit arrangement and the driver circuit of the further circuit arrangement. By controlling the driver circuit of the circuit arrangement and the driver circuit of the further circuit arrangement, the circuit arrangement and the further circuit arrangement can be operated by the control unit.

It is possible that a stator current, for example a three-phase alternating current in particular, can be provided by means of the power electronic circuits respectively assigned to the driver circuits to energize a stator of the electric machine or alternatively a current for energizing a rotor of the electric machine. In so doing, the driver circuits can respectively control or switch the switching element or the switching elements of the associated power electronic circuit. An "insulated gate bipolar transistor" (IGBT) and/or a silicon carbide-based metal-oxide semiconductor field effect transistor (SiC-MOSFET) can, in particular, be used as the at least one switching element of the power electronic circuit of the further circuit arrangement and/or as the at least one switching element of the power electronic circuit of the further circuit arrangement. In particular, these can be designed to switch a voltage of a high-voltage energy storage device such as a high-voltage battery, for example, having a voltage greater than 200 V.

In some embodiments, it can be provided that the circuit arrangement comprises an inverter, in particular a three-phase inverter, and/or that the further circuit arrangement comprises a half-bridge, a quasi-full bridge, a full bridge and/or a current measuring device. The control unit can thus be used to operate the inverter, in particular a three-phase inverter, of the circuit arrangement for energizing the stator of the electrical machine. If a further circuit arrangement is connected, the control unit can also operate the half-bridge, the quasi-full bridge, the full bridge and/or the current measuring device of the further circuit arrangement designed to supply current to a rotor of the electrical machine. A quasi-full bridge can thereby comprise two switching elements and two diodes and can be used, in particular, for setting only a positive current.

The inverter can be formed by the power electronic circuit of the circuit arrangement comprising at least one switching element, and the half bridge and/or the full bridge can be formed by the power electronic circuit of the circuit arrangement comprising at least one switching element. The current measuring device can, for example, be integrated in the driver circuit of the further circuit arrangement.

A direct current provided by an energy storage device such as a battery can be converted by means of the inverter of the circuit arrangement, in particular a three-phase inverter into an alternating current for energizing a stator of the electrical machine, in particular a three-phase stator. By means of a further circuit arrangement comprising a half bridge, a quasi-full bridge and/or a full bridge for energizing a rotor, the direct current provided by the energy storage device can be converted into a current for energizing the rotor of the electrical machine. For example, the further circuit arrangement may convert the direct current provided by the energy storage device into a direct current having a different voltage, a pulsed direct current, and/or an alternating current. The further circuit arrangement can therefore provide a rotor current or an excitation current with which the rotor or an excitation winding of the electrical machine is energized.

The further circuit arrangement can comprise a current measuring device by means of which the rotor current or alternatively excitation current used to energize the rotor of the electric machine is measured. With the further circuit arrangement connected to the control unit, a measured value generated by the current measuring device can be read out by the control unit and used to operate the further circuit arrangement.

In some embodiments, it can be provided that the control unit is set up to control the circuit arrangement and the further circuit arrangement, each with a safety control. The safety control of the circuit arrangement and/or the safety control of a further circuit arrangement connected to the control unit can be performed, for example, when a safety criterion evaluated by the control unit is satisfied. The safety criterion can be evaluated, for example, on the basis of information transmitted to the control unit and/or on the basis of information generated by the control unit and/or by sensors connected to the control unit.

If no further circuitry is connected to the control unit, the safety control can be performed by the circuit arrangement only if the safety criterion is met. If a further circuit arrangement is connected, the safety control can be performed at the further circuit arrangement or, in particular, at the circuit arrangement and the further circuit arrangement. In this way, when the safety criterion is fulfilled, a safety control associated with the safety criterion can be performed so that, irrespective of the type of electrical machine operated, a measure meeting the safety criterion can be taken by the respective safety control and a safety objective can be achieved.

The circuit arrangement and/or a further circuit arrangement connected to the control unit can be controlled, in particular, as a function of the type of electrical machine used and/or a level of a DC voltage with which the circuit arrangement and/or the further circuit arrangement are supplied, in order to ensure a safe state of the electrical machine. For this purpose, the circuit arrangement and/or the further circuit arrangement can each be switched to a safe state. In this way, it is possible to implement certain requirements in accordance with the functional safety of the electrical machine or alternatively the circuit arrangements operating it.

For the control of safety, it can be provided that the electrical machine can be switched torque-free or substantially torque-free by the safety control of the circuit arrangement and/or by the safety control of the further circuit arrangement. When a fault condition occurs, in which, for example, a used safety criterion is fulfilled, a primary safety objective can be achieved by the torque-free switching of the electrical machine. By switching the electric machine to be torque-free, it can be prevented that a force and/or a torque continues to be generated by the electric machine when the fault condition occurs. In this way, for example, undesirable consequences can be avoided in the event of a fault. The control unit can be used to switch the electric machine to be torque-free both for an electric machine in which only the stator is operated by the circuit arrangement connected to the control unit, as well as for an electric machine in which both the stator and the rotor are energized via the circuit arrangement or alternatively the further circuit arrangement. In this context, the terms "torque-free" or alternatively "substantially torque-free" refer in particular to a driving torque. In some types of electrical machines, for example, in permanently excited synchronous machines, it is possible that, in a torque-free or alternatively substantially torque-free state of the electrical machine, a braking torque or a deceleration torque is generated, for example, by induction during an active short circuit or during freewheeling.

It can be provided that the stator of the electric machine can be switched by the safety control of the circuit arrangement to be current-free or substantially current-free or to a switching state bringing about a current-free state or a substantially current-free state of the stator, and that the rotor of the electric machine can be switched by the safety control of the further circuit arrangement to be current-free or substantially current-free or to a switching state bringing about a current-free state or a substantially current-free state of the rotor. In a circuit arrangement comprising an inverter, in particular a three-phase inverter, the safety control of the circuit arrangement can be generated freewheeling, in which, for example, all switching elements of the inverter are open, or generate an active short circuit on a high-potential side of the inverter, in which, for example, all switching elements on the high-potential side are closed and all switching elements on a low-potential side of the inverter are open, or generate an active short circuit on the low-potential side of the inverter in which, for example, all switching elements on the high-potential side are open and all switching elements on the low-potential side are closed. These safe switching states of the circuit arrangement result in each case in a current-free or alternatively substantially current-free state of the stator, whereby the electrical machine can be switched torque-free.

In this context, a current-free or substantially current-free state of a stator and/or a rotor refers to the fact that no current generating a drive torque of the machine flows through the stator and/or the rotor anymore. It is possible that, depending on a type of machine used, a current causing, for example, a braking torque or a deceleration torque still flows in the stator or the rotor, at least temporarily, even in the current-free or substantially current-free state. For example, this can occur in the stator of a permanently excited synchronous machine, in particular in the case of an active short circuit or during freewheeling of the stator, if a voltage induced by a rotating rotor exceeds a voltage of an intermediate circuit.

The safety control of the further circuit arrangement can also switch the rotor of the electrical machine to a current-free state or to a switching state causing a current-free state of the rotor. Depending on the design of the further circuit arrangement, this can also take place by a freewheeling, by an active short circuit on a high potential side or by an active short circuit on a low potential side of a half bridge and/or by a full bridge of the further circuit arrangement.

In some embodiments, it may be provided that the safety control of the electrical circuit satisfies a higher safety requirement level than the safety control of the further electrical circuit. Since the functional safety requirements can already be implemented by the control unit, a lower safety requirement level can be used for the safety control of the further circuit arrangement, so that a less costly implementation of the further circuit arrangement is possible. For example, it is possible for the safety control of the electrical circuit arrangement to satisfy the safety requirement level ASIL-D according to ISO 26262 and for the safety control of the further electrical circuit arrangement to satisfy the safety requirement level ASIL-A according to ISO 26262. It is also possible that the safety control of the further electrical circuit arrangement satisfies the safety requirement level of a quality management (QM) system according to ISO 26262.

A main safety objective that is to be achieved, such as a torque-free state of the electrical machine, can thereby already take place with a high safety requirement level through a control of the circuit arrangement with a corresponding safety control by the control unit. An additional switch-off by the further circuit arrangement of a rotor current or alternatively exciter current, which is only present in certain machine types, and where said switch-off is likewise carried out for safety reasons, can therefore also be fulfilled with a lower safety level requirement.

For a control circuit, it is provided that it comprises a control unit as described herein and an electrical circuit arrangement connectable to the electrical machine for operating the electrical machine. The control unit and the electrical circuit arrangement can thereby be formed on a common carrier element, for example a common printed circuit board. It is also possible that the control unit and the electrical circuit arrangement are each formed on separate carrier elements or alternatively separate circuit boards, wherein the circuits or alternatively the circuit boards are electrically connected to one another, for example, by means of at least one electrical line and/or a plug-in connection.

It can be provided that the control circuit comprises a further circuit arrangement which is designed for energizing a rotor of the electric machine. The further circuit arrangement can thereby, in particular, be formed on a separate carrier element, in particular on a separate printed circuit board, wherein the further circuit arrangement is electrically connected to the control circuit, in particular to the control unit of the control circuit. The further circuit arrangement can be connected to the control circuit, for example, by means of a plug connection 17.

For a motor vehicle, it is provided that it comprises a control unit as described herein and/or a control circuit as described herein. The electric machine operated by the circuit arrangement and/or the further circuit arrangement can in particular be the or one traction electric motor of the motor vehicle. The electric machine may be a permanently excited synchronous machine, an externally excited synchronous machine, or an asynchronous machine. The motor vehicle may furthermore comprise an energy storage device, in particular a high-voltage battery, which provides a direct current that is used by the circuit arrangement and/or the further circuit arrangement to energize the stator and/or to energize the rotor of the electric machine.

All the advantages and embodiments described above in relation to the control unit also apply correspondingly to the control circuit and to the motor vehicle.

DETAILED DESCRIPTION

Figure 1:
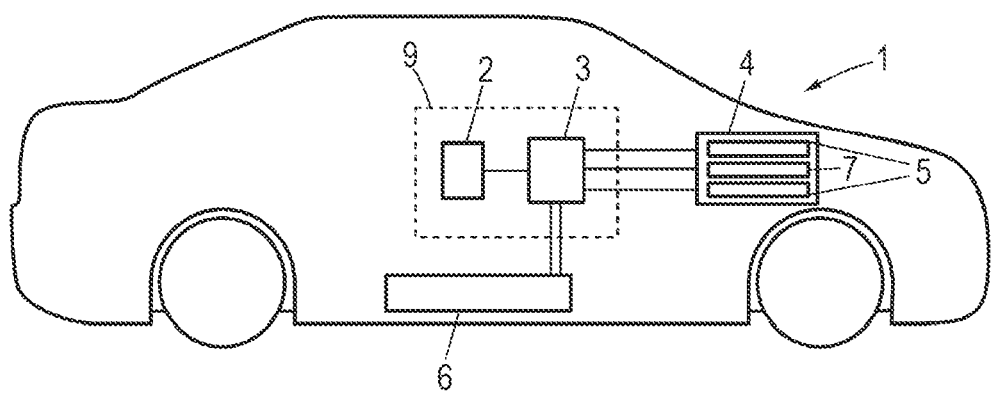
FIG. 1 shows a schematic side view of a first embodiment of a motor vehicle.

FIG. 1 shows a first embodiment of a motor vehicle 1. The motor vehicle 1 comprises a control unit 2 for operating an electrical circuit arrangement 3, which is connected to an electrical machine 4 of the motor vehicle 1. The control unit 2 and the circuit arrangement 3 form a control circuit 9. The electrical circuit arrangement 3 is designed to energize a stator 5 of the electrical machine 4. The circuit arrangement 3 is designed to convert a direct current generated by an energy storage device 6 of the motor vehicle 1 into a three-phase alternating current for energizing the stator 5 of the electric machine 4. For this purpose, the circuit arrangement 3 is operated by the control unit 2. The control unit 2 can thus operate, in particular control and/or regulate, an electric machine 4 of the motor vehicle 1, which is designed, for example, as a permanently excited synchronous machine or as an asynchronous machine. In such a type of electric machine, it is not necessary to energize a rotor 7 of the electric machine 4.

However, the control unit 2 is further designed to also operate a further circuit arrangement 8 which is designed to energize a rotor of an externally excited electrical machine. This makes it possible for the control unit 2 to also be used in a motor vehicle which has, for example, an externally excited synchronous machine as the electrical machine 4.

Figure 2:
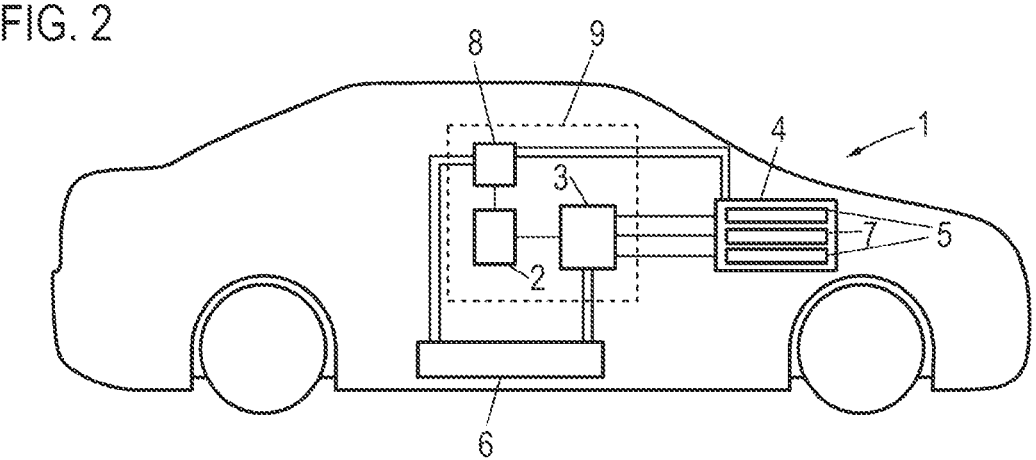
FIG. 2 shows a side view of a second embodiment of a motor vehicle.

Such a motor vehicle is shown as a second embodiment in FIG. 2. In this embodiment, the motor vehicle 1 comprises, in addition to the components of the first embodiment, a further circuit arrangement 8 which is designed to energize the rotor 7 of the electric machine 4. The control unit 2, the circuit arrangement 3 and the further circuit arrangement 8 thereby form a control circuit 9. In this embodiment, the electric machine 4 is designed as an externally excited synchronous machine. The further circuit arrangement 8 provides an excitation current via which the rotor 7 of the electric machine 4 is energized. The further circuit arrangement 8 is also connected to the energy storage device 6 of the motor vehicle 1 for this purpose.

Figure 3:
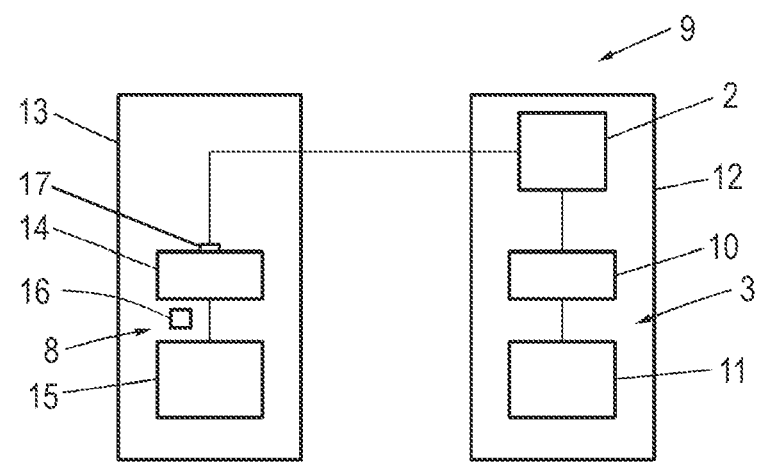
FIG. 3 shows an embodiment of a control circuit.

FIG. 3 shows an embodiment of a control circuit 9. This control circuit 9 can be, for example, the control circuit 9 used in the motor vehicle shown in FIG. 2. The circuit arrangement 3 comprises a driver circuit 10 as well as a power electronic circuit 11 comprising a plurality of switching elements. The power electronic circuit 11 is designed as a three-phase inverter. The driver circuit 10 is designed as a gate driver for controlling the switching elements of the power electronic circuit 11. The switching elements of the power electronic circuit 11 may be, for example, insulating gate bipolar transistors (IGBTs) or silicon carbide-based metal oxide semiconductor field effect transistors (SiC-MOSFET). The control unit 2 and the further circuit arrangement 3 are thereby formed on a common carrier element 12. The carrier element 12 can, for example, be a printed circuit board. The further circuit arrangement 8 formed on a separate carrier element 13 is connected to the control unit 2. This arrangement comprises a driver circuit 14 and a power electronic circuit 15 comprising a switching element. The power electronic circuit 15 can be designed as a half bridge, a quasi-full bridge or a full bridge. A quasi-full bridge can thereby comprise two switching elements and two diodes and can, in particular, be used only for the setting of a positive current. The further circuit arrangement 8 furthermore, comprises a current measuring device 16. The current measuring device 16 can measure a rotor current or alternatively an excitation current generated by the further circuit arrangement 8 and is connected to the control unit 2. The control unit 2 may operate the further circuit arrangement 8 in response, for example, to a measured value generated by the current measuring device 16.

A control of the power electronic circuit 15 can be undertaken by the driver circuit 14, so that a direct current taken, for example, from the energy storage device 6 of the motor vehicle 1 is converted by the power electronic circuit into a current for energizing the rotor 7 of an electric machine 4 designed as an externally excited synchronous machine. The power electronic circuit 15 can, for example, generate an alternating current, a direct current with a different voltage level or a pulsed direct current from the direct current. The control unit 2 controls the driver circuit 14 in the same way as the driver circuit 10.

The control unit 2 also enables safety control of the circuit arrangement 3 and safety control of the further circuit arrangement 8. By means of the safety control of the circuit arrangement 3 and/or by means of the safety control of the further circuit arrangement 8, an electrical machine 4, which is connected to the control circuit 9, can be switched torque-free. This is required both for electrical machines in which only an energization of the stator is provided by the circuit arrangement 3, for example, in the first embodiment of a motor vehicle 1 according to FIG. 1, and for embodiments in which an electrical machine is used in which both the stator and the rotor are energized, for example, in the second embodiment of a motor vehicle 1 according to FIG. 2. This makes it possible for the control unit 2 or alternatively the control circuit 9 to flexibly be used for different types of electrical machine 4.

A safety control of the circuit arrangement 3 and/or of the further circuit arrangement 9 can be carried out, for example, when a safety criterion evaluated by the control unit 2 is fulfilled. The safety criterion can be evaluated by the control unit 2 on the basis of information transmitted to the control unit, for example, information transmitted via a data bus of the motor vehicle 1, and/or on the basis of information generated by the control unit 2 and/or by sensors connected to the control unit 2.

The circuit arrangement 3 is switched by the safety control of the circuit arrangement 3 to a switching state that causes the stator 5 to become current-free. This causes the stator 5 of the electrical machine 4 to become current-free. The switching state can, for example, be freewheeling, an active short circuit on a high-potential side or an active short circuit on the low-potential side of the power electronic circuit 11 which are designed as a three-phase inverter. To achieve this switching state, the control unit 2 performs a corresponding control of the driver circuit 10, which accordingly sets the switching state of the power electronic circuit 11 at the switching elements of the power electronic circuit 11.

Accordingly, a safety control of the further circuit arrangement 3 can also be carried out, in which the control unit 2 controls the driver circuit 14 to bring about a current-free state of the rotor 7 of the electrical machine 4. Freewheeling or a short-circuiting of a half-bridge and/or a full-bridge of the power electronic circuit 15 can, for example, be performed by means of the driver circuit 14. In this way, the rotor of an electric machine can also be switched to be current-free.

The safety control of the electrical circuit 3 can thereby satisfy a higher safety requirement level than the safety control of the further electrical circuit 8. For example, the safety control of the electrical circuit 3 can satisfy the safety requirement level ASIL-D according to ISO 26262 and the safety control of the further electrical circuit 8 can satisfy the safety requirement level ASIL-A or the safety requirement level QM according to ISO 26262. Consequently, when using the control unit 2, a safety control of the circuit arrangement 3 can be carried out by means of the high safety requirement level irrespective of the type of electrical machine 4 used, since a safety objective to be achieved, such as, for example, a torque-free or substantially torque-free state of the electrical machine 4, is already achieved by the current-free or substantially current-free switching of the stator or alternatively by the switching state of the power electronic circuit 11 bringing about a current-free or substantially current-free state of the stator.

Due to the design of the control unit 2, if a further circuit arrangement 8 is connected to the control unit 2, it is possible that a safety control of the further circuit arrangement 8 can also additionally or alternatively be carried out by the control unit 2, so that the rotor 7 of the electric machine 4 is also switched to a current-free state or alternatively the power electronic circuit 15 is switched to a switching state bringing about a current-free state of the rotor 7 by a corresponding control of the driver circuit 14.

The terms "torque-free" or "substantially torque-free" in this context refer in particular to a driving torque. In some types of electrical machines 4, for example in permanently excited synchronous machines, it is possible that in a torque-free or substantially torque-free state of the electrical machine 4 a braking torque or a deceleration torque is generated, for example, by induction during an active short circuit or freewheeling.

Accordingly, a current-free or substantially current-free state of a stator 5 and/or a rotor 7 refers to the fact that no current generating a driving torque of the machine flows through the stator 5 and/or the rotor 7 anymore. It is possible that, depending on a type of machine used, at least temporarily a current causing, for example, a braking torque or a deceleration torque still flows in the stator 5 and/or the rotor 7, even in the current-free or substantially current-free state. For example, this may occur in the stator 5 of a permanently excited synchronous machine, in particular in the case of an active short circuit or freewheeling of the stator 5, if a voltage induced by a rotating rotor 7 exceeds a voltage of an intermediate circuit.

The further circuit arrangement 8 can be connected to the control unit 2, for example, via a plug-in connection of the carrier element 13 to the carrier element 12. In addition to the use of a common carrier element 12 for the circuit arrangement 3 and the control unit 2, it is also possible for the control unit 2 and the circuit arrangement 3 each to be arranged on a separate carrier element, for example, a printed circuit board, an electrical connection between the control unit 2 and the circuit arrangement 3 being produced by a connection of the carrier elements, for example via an electrical line and/or a plug-in connection.

German patent application no. 10 2020 109481.7, filed Apr. 6, 2020, to which this application claims priority, is hereby incorporated herein by reference in its entirety.

Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:
   an electrical circuit arrangement connected to an electrical machine;
   a control unit which, in operation, controls the electrical circuit arrangement;
   a first circuit board on which the electrical circuit arrangement and the control unit are arranged; and
   a second circuit board on which a further circuit arrangement is arranged;
   wherein the further circuit arrangement and the control unit are electrically connected by a plug connection,
   wherein the electrical circuit arrangement, in operation, energizes a stator of the electrical machine;
   wherein the control unit is connected to the further circuit arrangement which, in operation, energizes a rotor of the electrical machine;
   wherein the control unit, in operation, controls the further circuit arrangement;
   wherein the control unit, in operation, controls the electrical circuit arrangement and the further circuit arrangement, each with a safety control, such that the electrical machine is switched to a driving torque-free state or a substantially driving torque-free state by at least one of the safety control of the electrical circuit arrangement or by the safety control of the further circuit arrangement; and
   wherein the stator of the electrical machine is switched by the safety control of the electrical circuit arrangement to a current-free or substantially current-free state or to a switching state which brings about the current-free state or substantially current-free state of the stator, and the rotor of the electric machine is switched by the safety control of the further circuit arrangement to a current-free or substantially current-free state or to a switching state which brings about the current-free state or substantially current-free state of the rotor.

2. The system according to claim 1, wherein the electrical circuit arrangement and the further circuit arrangement each comprise a driver circuit and a power electronic circuit comprising at least one switching element, and the control unit, in operation, controls the driver circuit of the electrical circuit arrangement and the driver circuit of the further circuit arrangement.

3. The system according to claim 1, wherein the electrical circuit arrangement comprises an inverter.

4. The system according to claim 3, wherein the inverter is a three-phase inverter.

5. The system according to claim 3, wherein the electrical circuit arrangement includes an inverter having a plurality of switching elements, and wherein control unit, in operation, controls the electrical circuit arrangement such that each of the switching elements is open.

6. The system according to claim 3, wherein the electrical circuit arrangement includes an inverter having a high-potential side, a low-potential side and a plurality of switching elements, and wherein the control unit, in operation, controls the electrical circuit arrangement such that each of the switching elements on the high-potential side of the inverter is closed and each of the switching elements on the low-potential side of the inverter is open.

7. The system according to claim 3, wherein the electrical circuit arrangement includes an inverter having a high-potential side, a low-potential side, and a plurality of switching elements, and the control unit, in operation, controls the electrical circuit arrangement such that each of the switching elements on the high-potential side of the inverter is open and each of the switching elements on the low-potential side of the inverter is closed.

8. The system according to claim 1, wherein the further circuit arrangement comprises at least one of a half bridge, a quasi-full bridge, a full bridge and a current-measuring device.

9. The system according to claim 1, wherein the safety control of the electrical circuit arrangement satisfies a higher safety requirement level than the safety control of the further circuit arrangement.

10. The system according to claim 1, wherein the control unit is a component of a motor vehicle.

11. A control circuit, comprising:
   a control unit which, in operation, controls an electrical circuit arrangement connected to an electrical machine;
   the electrical circuit arrangement, wherein the electrical circuit arrangement is connected to the electrical machine to operate the electrical machine,
   a first circuit board on which the electrical circuit arrangement and the control unit are arranged; and
   a second circuit board on which a further circuit arrangement is arranged;
   wherein the further circuit arrangement and the control unit are electrically connected by a plug connection,
   wherein the electrical circuit arrangement, in operation, energizes a stator of the electrical machine,
   wherein the control unit is connected to the further circuit arrangement which, in operation, energizes a rotor of the electrical machine;

wherein the control unit, in operation, controls the further circuit arrangement; and wherein the control unit, in operation, controls the electrical circuit arrangement and the further circuit arrangement, each with a safety control, such that the electrical machine is switched to a driving torque-free or a substantially driving torque-free by the safety control of the electrical circuit arrangement or by the safety control of the further circuit arrangement; and wherein the stator of the electrical machine is switched by the safety control of the electrical circuit arrangement to a current-free or substantially current-free state or to a switching state which brings about the current-free state or substantially current-free state of the stator, and the rotor of the electric machine is switched by the safety control of the further circuit arrangement to a current-free or substantially current-free state or to a switching state which brings about the current-free state or substantially current-free state of the rotor.

12. The control circuit according to claim 11, wherein the control circuit comprises the further circuit arrangement.

13. The control circuit according to claim 11, wherein the control circuit is a component of a motor vehicle.

14. The control circuit according to claim 11, wherein the electrical circuit arrangement includes an inverter having a plurality of switching elements, and wherein the control unit, in operation, controls the electrical circuit arrangement such that each of the switching elements is open.

15. The control circuit according to claim 11, wherein the electrical circuit arrangement includes an inverter having a high-potential side, a low-potential side, and a plurality of switching elements, and wherein the control unit, in operation, controls the electrical circuit arrangement such that each of the switching elements on the high-potential side of the inverter is closed and each of the switching elements on the low-potential side of the inverter is open.

16. The control circuit according to claim 11, wherein the electrical circuit arrangement includes an inverter having a high-potential side, a low-potential side, and a plurality of switching elements, and wherein the control unit, in operation, controls the electrical circuit arrangement such that each of the switching elements on the high-potential side of the inverter is open and each of the switching elements on the low-potential side of the inverter is closed.

* * * * *